US011686387B2

(12) United States Patent
Hiraoka et al.

(10) Patent No.: US 11,686,387 B2
(45) Date of Patent: Jun. 27, 2023

(54) CONTINUOUSLY VARIABLE TRANSMISSION AND CONTROL METHOD FOR CONTINUOUSLY VARIABLE TRANSMISSION

(71) Applicant: JATCO Ltd, Fuji (JP)

(72) Inventors: Tadaaki Hiraoka, Atsugi (JP); Kouhei Toyohara, Sagamihara (JP); Masanori Yamazaki, Isehara (JP); Yoshiteru Kanayama, Yokohama (JP); Takashi Saitou, Isehara (JP)

(73) Assignee: JATCO LTD, Fuji (JP)

( * ) Notice: Subject to any disclaimer, the term of this patent is extended or adjusted under 35 U.S.C. 154(b) by 32 days.

(21) Appl. No.: 17/598,982

(22) PCT Filed: Nov. 1, 2019

(86) PCT No.: PCT/JP2019/043127
§ 371 (c)(1),
(2) Date: Sep. 28, 2021

(87) PCT Pub. No.: WO2020/202625
PCT Pub. Date: Oct. 8, 2020

(65) Prior Publication Data
US 2022/0178440 A1     Jun. 9, 2022

(30) Foreign Application Priority Data
Apr. 2, 2019    (JP) ................................ 2019-070608

(51) Int. Cl.
*F16H 61/662*     (2006.01)
*B60K 6/543*     (2007.10)
(Continued)

(52) U.S. Cl.
CPC ....... *F16H 61/66272* (2013.01); *B60K 6/543* (2013.01); *F16H 9/18* (2013.01);
(Continued)

(58) Field of Classification Search
CPC ...... F16H 9/18; F16H 57/0489; F16H 57/046; F16H 59/18; F16H 59/44; F16H 59/66;
(Continued)

(56) References Cited

U.S. PATENT DOCUMENTS

| | | | |
|---|---|---|---|
| 2007/0213149 A1* | 9/2007 | Tanaka .............. | F16H 61/66272 474/8 |
| 2012/0244974 A1* | 9/2012 | Tsuji ...................... | F16H 55/56 474/28 |
| 2015/0276016 A1* | 10/2015 | Yagasaki .................. | F16G 5/16 474/148 |

FOREIGN PATENT DOCUMENTS

| | | |
|---|---|---|
| JP | 2017-516966 A | 6/2017 |
| JP | 2020-168912 A | 10/2020 |
| JP | 2020-169669 A | 10/2020 |

* cited by examiner

*Primary Examiner* — Edwin A Young
(74) *Attorney, Agent, or Firm* — Foley & Lardner LLP

(57) ABSTRACT

A continuously variable transmission includes a primary pulley, a secondary pulley, a metal belt wound around the primary pulley and the secondary pulley, and a controller. The metal belt includes a ring and a plurality of elements. The elements have respective receiving portions opening in a radial direction of the belt and receive the ring in the receiving portions. The controller executes a preliminary determined falling-off countermeasure control of the element when the end play larger than the predetermined length is detected to be generated or the continuously variable transmission is detected to be under the operation condition in which the end plays concentrate.

9 Claims, 10 Drawing Sheets

(51) Int. Cl.
- *F16H 9/18* (2006.01)
- *F16H 57/04* (2010.01)
- *F16H 59/18* (2006.01)
- *F16H 59/44* (2006.01)
- *F16H 59/66* (2006.01)
- *F16H 59/68* (2006.01)
- *F16H 63/50* (2006.01)

(52) U.S. Cl.
CPC ......... *F16H 57/0489* (2013.01); *F16H 59/18* (2013.01); *F16H 59/44* (2013.01); *F16H 59/66* (2013.01); *F16H 59/68* (2013.01); *F16H 63/50* (2013.01); *B60Y 2200/92* (2013.01); *F16H 57/046* (2013.01); *F16H 2059/663* (2013.01)

(58) Field of Classification Search
CPC ............... F16H 59/68; F16H 61/66272; F16H 2061/6629; F16H 2061/66295; F16H 2059/663; F16H 63/50; B60K 6/543; B60Y 2200/92

See application file for complete search history.

CONTINUOUSLY VARIABLE TRANSMISSION AND CONTROL METHOD FOR CONTINUOUSLY VARIABLE TRANSMISSION

TECHNICAL FIELD

The present invention relates to a continuously variable transmission and a control method thereof, in particular, relates to a technique to suppress fall-off of an element disposed in a belt of the continuously variable transmission.

BACKGROUND ART

There has been known a continuously variable transmission that includes a belt configured by bundling a plurality of transverse members, which are media or elements that transmit a power, with a ring or a circular band as a continuously variable transmission configured to steplessly adjust a speed ratio by changing a contact diameter of the belt against a pair of variable pulleys. JP2017-516966A discloses a belt that includes an element formed into an approximate U-shape as a belt applied to such a continuously variable transmission (paragraphs 0025 to 0027). This element has a base portion and a pair of pillar portions extending in the same direction from both ends of the base portion, and is mounted on one ring through an opening between the pillar portions.

SUMMARY OF INVENTION

In a continuously variable transmission that transmits a power via elements, there is a case where a gap (referred to as an "end play") between adjacent elements widens to increase a total quantity of the end plays over a whole circumference of the belt. In such a state, it is concerned that the end plays locally concentrate, and furthermore, a force in a lateral direction is applied on the elements to cause the elements to fall off of the ring. This is because, although in JP2017-516966A, a hook is provided in the pillar portion of the element and the element is locked to the ring by this hook, when the force in the lateral direction is applied to the elements and the elements move in the lateral direction with respect to the ring, the lock with the hook is released. The widened end play is generated by, besides a generation of extension in the ring, a compression of the elements caused by other elements, and an abrasion caused by friction between the elements.

In consideration of the problems described above, an objective of the present invention is to provide a continuously variable transmission that ensures suppressing an element having a receiving portion, which receives a ring and opens in a radial direction of a belt, from falling off of the ring and a control method thereof.

According to an aspect of the present invention, a continuously variable transmission mounted on a vehicle, including a primary pulley, a secondary pulley, a belt wound around the primary pulley and the secondary pulley, and a controller, is provided. In this aspect, the belt includes a ring, and a plurality of elements bundled by the ring, the elements having respective receiving portions opening in a radial direction of the belt, the elements receiving the ring in the receiving portions. The controller is configured to detect that an end play larger than a predetermined length is generated on the belt or detects that the continuously variable transmission is under an operation condition in which individual end plays between the adjacent elements concentrate; and execute a preliminarily determined falling-off countermeasure control of the element when the end play larger than the predetermined length is detected to be generated or the continuously variable transmission is detected to be under the operation condition in which the end plays concentrate.

According to another aspect of the present invention, a control method for controlling a continuously variable transmission, the continuously variable transmission including a plurality of elements receiving a ring in receiving portions opening in a radial direction of a belt and being bundled by the ring, is provided. In this aspect, it is detected that an end play larger than a predetermined length is generated on the belt or detecting that the continuously variable transmission is under an operation condition in which individual end plays between the adjacent elements concentrate. A preliminarily determined falling-off countermeasure control of the element is executed when the end play larger than the predetermined length is detected to be generated or the continuously variable transmission is detected to be under the operation condition in which the end plays concentrate.

These configurations ensure suppressing the element from falling off of the ring by executing the predetermined falling-off countermeasure control when it is detected that the end play larger than the predetermined length is generated on the belt or the continuously variable transmission is under the operation condition in which the end plays concentrate.

DESCRIPTION OF EMBODIMENTS

The following describes embodiments of the present invention with reference to the drawings.

(Configuration of Vehicle Drive System)

Figure 1:
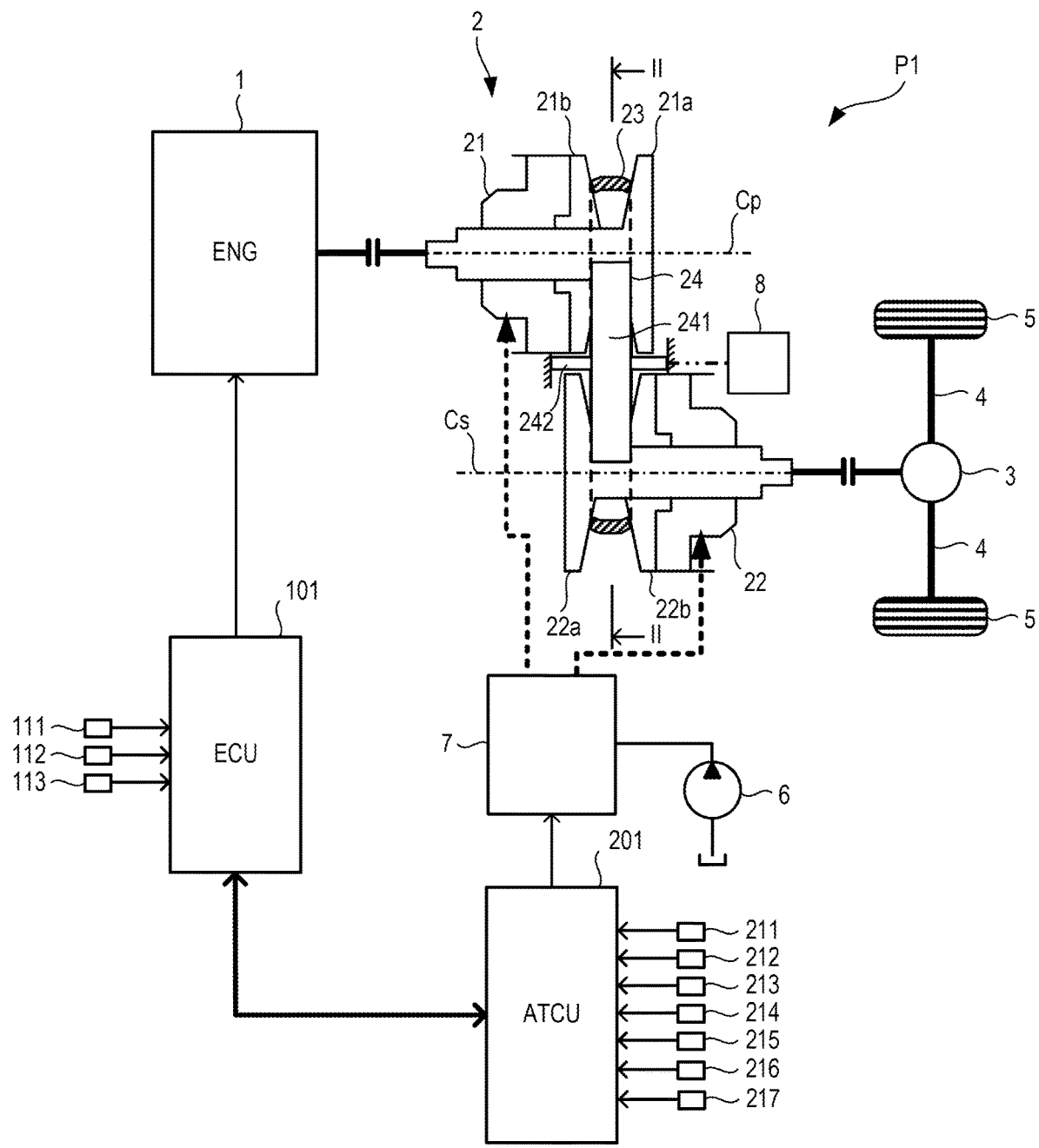
FIG. 1 is a schematic diagram illustrating a configuration of a power transmission system of a vehicle including a continuously variable transmission according to one embodiment of the present invention.

FIG. 1 schematically illustrates an overall configuration of a power transmission system (hereinafter referred to as a "drive system") P1 of a vehicle including a continuously variable transmission (CVT) 2 according to one embodiment of the present invention.

The driving system P1 according to the embodiment includes an internal combustion engine (hereinafter simply referred to as an "engine") 1 as a driving source of the vehicle, and includes the CVT 2 on a power transmission path coupling the engine 1 to left and right driving wheels 5, 5. The engine 1 and the CVT 2 can be coupled via a torque converter. The CVT 2 converts a rotative power input from the engine 1 at a predetermined speed ratio and outputs it to the driving wheels 5 via a differential gear 3.

The CVT 2 includes a primary pulley 21 at an input side and includes a secondary pulley 22 at an output side as a speed change element. The CVT 2 includes a metal belt 23 wound around the primary pulley 21 and the secondary pulley 22, and changing a ratio of a contact portion radius of the metal belt 23 on these pulleys 21, 22 ensures steplessly changing the speed ratio.

The primary pulley 21 and the secondary pulley 22 include fixed sheaves 21a, 22a, and movable sheaves 21b, 22b disposed coaxially with respect to the fixed sheaves and movably in an axial direction along rotational center axes Cp, Cs (FIG. 2) of the fixed sheaves. The fixed sheave 21a of the primary pulley 21 is coupled to an input shaft of the CVT 2, and the fixed sheave 22a of the secondary pulley 22 is coupled to an output shaft. The speed ratio of the CVT 2 is controlled by adjusting a pressure of a hydraulic oil affecting the movable sheaves 21b, 22b of the primary pulley 21 and the secondary pulley 22 and changing a width of a V groove formed between the fixed sheaves 21a, 22a and the movable sheaves 21b, 22b.

In this embodiment, as a generation source of an operating pressure of the CVT 2, an oil pump 6 that uses the engine 1 or an electric motor (not illustrated) as a power source is disposed. The oil pump 6 raises the pressure of the hydraulic oil stored in a transmission oil pan, and using this as a source pressure, supplies the hydraulic oil at a predetermined pressure to a hydraulic chambers of the movable sheaves 21b, 22b via a hydraulic pressure control circuit 7. FIG. 1 illustrates a hydraulic pressure supply passage from the hydraulic pressure control circuit 7 to the hydraulic chamber by the dotted lines with the arrow.

The rotative power output from the CVT 2 is transmitted to driving shafts 4 via a final gear train set to a predetermined reduction gear ratio or a sub-transmission (neither of them is illustrated) and via the differential gear 3 to rotate the driving wheel 5.

(Configuration and Basic Operation of Control System)

Operations of the engine 1 and the CVT 2 are controlled by an engine controller 101 and a transmission controller 201, respectively. The engine controller 101 and the transmission controller 201 are both configured as an electronic control unit, and include a microcomputer including a central processing unit (CPU), various kinds of storage devices, such as a RAM and a ROM, input/output interfaces, and the like.

The engine controller 101 inputs detection signals of operating state sensors detecting an operating state of the engine 1, executes a predetermined calculation on the basis of the operating state, and sets a fuel injection amount, a fuel injection timing, an ignition timing, and the like of the engine 1. As the operating state sensors, an accelerator sensor 111 that detects an operation amount of an accelerator pedal by a driver (hereinafter referred to as an "accelerator pedal opening"), a rotation speed sensor 112 that detects a rotation speed of the engine 1, a cooling water temperature sensor 113 that detects a temperature of the engine cooling water, and the like are provided. Further, an air flow meter, a throttle sensor, a fuel pressure sensor, an air-fuel ratio sensor, and the like (not illustrated) are also provided. The engine controller 101 inputs the detection signals of these sensors.

The transmission controller 201 is coupled to the engine controller 101 in a communicable manner with one another via a bus with a CAN standard. Furthermore, relating to a control of the CVT 2, a vehicle speed sensor 211 that detects a vehicle travelling speed, an input side rotation speed sensor 212 that detects a rotation speed of the input shaft of the CVT 2, an output side rotation speed sensor 213 that detects a rotation speed of the output shaft of the CVT 2, an oil temperature sensor 214 that detects a temperature of the hydraulic oil of the CVT 2, a shift position sensor 215 that detects a position of a shift lever, and the like are provided. The position of the shift lever is correlated to a shift range of the CVT 2.

Here, the vehicle speed sensor 211 is to detect a vehicle speed by converting a rotation speed of the driving shafts 4, and on the basis of its signal, it is possible to distinguish a rotation in a rotation direction of the driving shafts 4, that is, a rotation in one direction (for example, in a normal rotation direction at a vehicle forward movement) from a rotation in the opposite direction.

In this embodiment, in addition to the above, in relation to the falling-off suppressing control of the element described later, an acceleration sensor 216 and an end play sensor 217 are disposed. The acceleration sensor 216 is to detect an acceleration rate affecting in a front-rear direction on the vehicle (hereinafter referred to as a "front-rear direction acceleration rate"), and on the basis of its output, a posture of the vehicle or an inclination relative to a horizontal direction can be detected. The end play sensor 217 is to measure a magnitude (hereinafter referred to as an "end play length") of end plays concentrating on a predetermined position in the metal belt 23. The transmission controller 201 inputs information relating to an operating state of the engine 1, such as an accelerator pedal opening, from the engine controller 101, and inputs detection signals of these sensors.

The transmission controller 201, as a basic control relating to speed change, determines a shift range selected by a driver on the basis of a signal from the shift position sensor 215 and sets a target speed ratio of the CVT 2 on the basis of an accelerator pedal opening, a vehicle speed, and the like. The transmission controller 201 outputs a control signal of the hydraulic pressure control circuit 7 such that a predetermined hydraulic pressure corresponding to the target speed ratio affects the movable sheaves 21b, 22b of the primary pulley 21 and the secondary pulley 22 using the hydraulic pressure generated by the oil pump 6 as the source pressure.

Furthermore, the transmission controller 201, as a part of a control regarding speed change, as described later, outputs the control signal to an electric motor 8 to control a posture of a sensor supporting body 24. The end play sensor 217 is installed on the sensor supporting body 24, and a position of the end play sensor 217 with respect to the metal belt 23 (specifically, its inner circumference surface) is determined by the sensor supporting body 24.

(Configuration of CVT 2)

Figure 2:
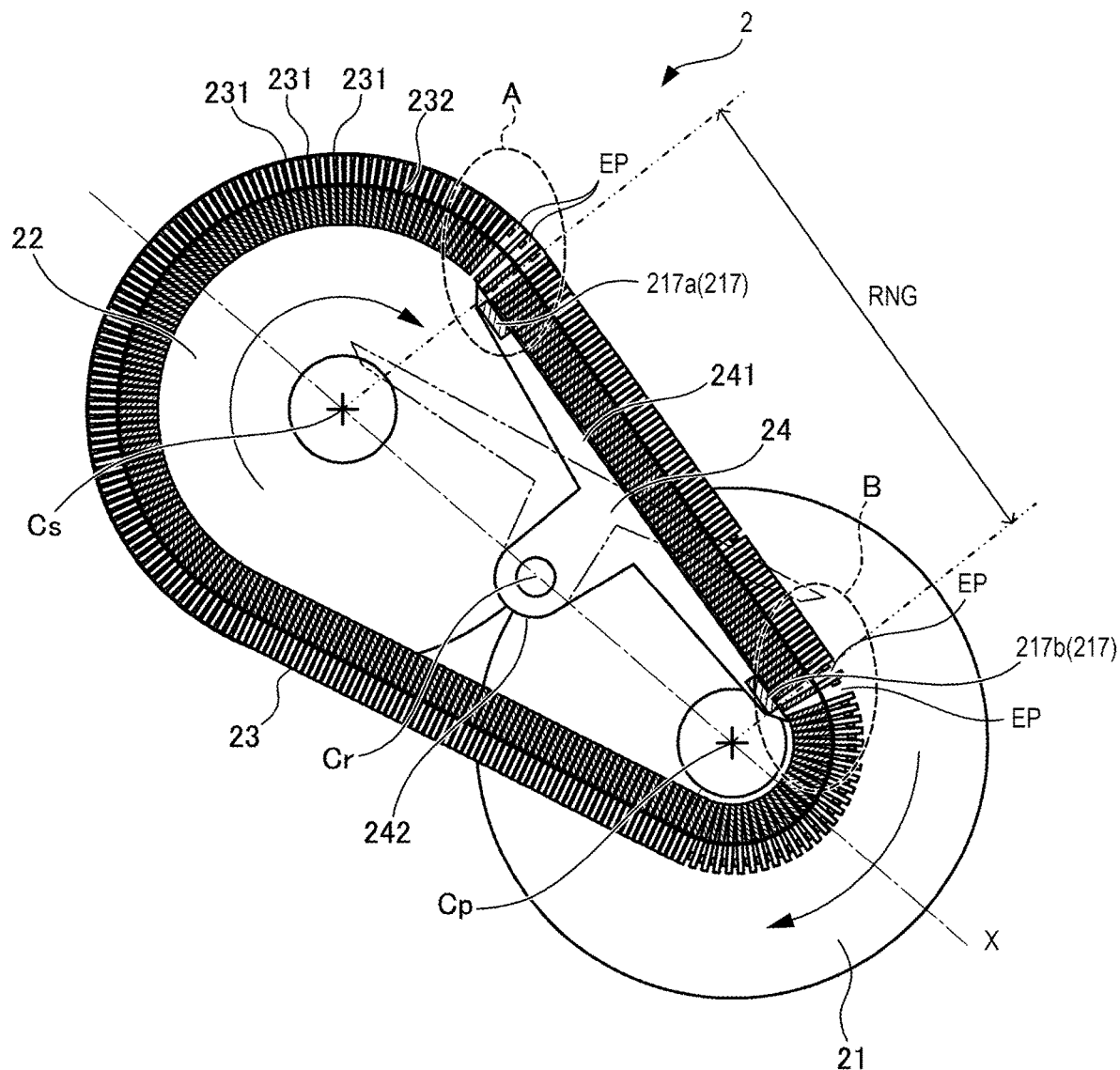
FIG. 2 is a cross-sectional view taken along II-II in FIG. 1.

FIG. 2 illustrates a configuration of the CVT 2 according to the embodiment in cross-section taken along the line II-II illustrated in FIG. 1.

In this embodiment, the CVT 2 includes the pair of variable pulleys, specifically, the primary pulley 21 and the secondary pulley 22, and the metal belt 23 wound around the pair of these pulleys 21, 22. Since FIG. 2 is a cross-section, FIG. 2 illustrates the movable sheave 21*b* of the primary pulley 21, the fixed sheave 22*a* of the secondary pulley 22, and the metal belt 23. The CVT 2 uses a push-belt type, and the metal belt 23 is configured by arranging a plurality of elements 231 as power transmission media in its thickness direction and bundling them with one another with a ring 232 (referred to as a "hoop" or a "band" in some cases).

Figure 3:
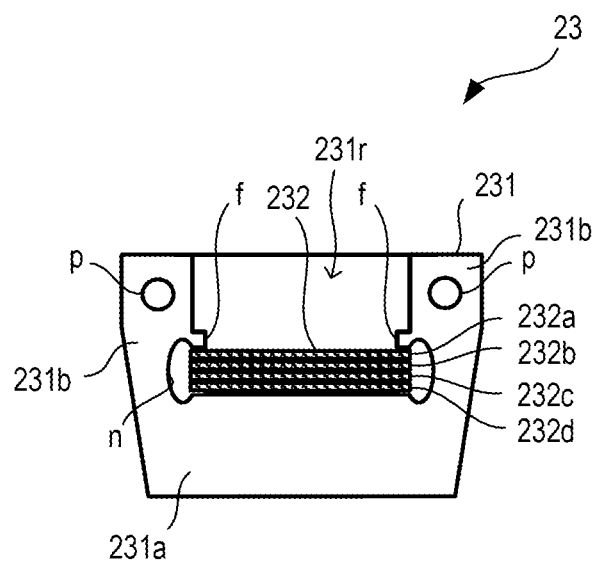
FIG. 3 is a cross-sectional view illustrating a configuration of a belt disposed in the continuously variable transmission.
Figure 3:
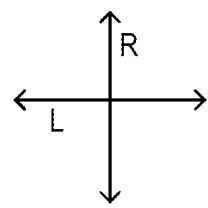

FIG. 3 illustrates a configuration of the element 231 according to the embodiment in cross-section perpendicular in a circumferential direction of the metal belt 23.

In this embodiment, the ring 232 of the metal belt 23 is one ring configured by laminating a plurality of ring members 232*a* to 232*d* with one another (referred to as a "ring set" in some cases), and the plurality of elements 231 are mounted on this one ring or the ring set 232, and thus, the metal belt 23 is configured. Since the number of the ring 232 is one, the metal belt 23 according to the embodiment is referred to as a mono-ring metal belt or simply referred to as a "mono-belt" in some cases. While FIG. 3 illustrates the case where the ring members are four (232*a* to 232*d*), it is needless to say that the number of the ring members is not limited to this.

The element 231, in general, is configured of a base portion 231*a* and a pair of side portions 231*b*, 231*b* extending perpendicularly in an extending direction of the base portion 231*a* and in the same direction with one another, and forms an approximate U shape as a whole in this embodiment. The base portion 231*a* is also referred to as a saddle portion, has a length enough to cross the ring 232, and has both ends on which contact surfaces with the respective sheaves 21*a*, 21*b*, 22*a*, 22*b* of the primary pulley 21 and the secondary pulley 22 are formed. The extending direction of the base portion 231*a* is a width direction of the element 231 and corresponds to a lateral direction L of the metal belt 23. The "lateral direction" relating to the metal belt 23 means a direction perpendicular to a circumferential direction and a radial direction of the metal belt 23. The side portions 231*b* are also referred to as pillar portions, the respective sides sandwiching the ring 232 are coupled to the base portion 231*a*, and their extending direction is a height direction of the element 231 and corresponds to a radial direction R of the metal belt 23. Inner surfaces of the pair of these side portions 231*b*, 231*b* that are facing one another and a top surface of the base portion 231*a* form a receiving portion 231*r* of the element 231 that opens in a direction perpendicular to the lateral direction L, that is, in the radial direction R of the metal belt 23. In this embodiment, the direction in which the receiving portion 231*r* opens is outward with respect to the radial direction R of the metal belt 23. The element 231 is mounted on the ring 232 from the inner peripheral side of the metal belt 23 with the ring 232 received by the receiving portion 231*r*.

The element 231 has hooks or clamping pieces f that inwardly project from the insides on the respective left and right side portions 231*b* forming the receiving portion 231*r*, and the ring 232 is held between the base portion 231*a* and these hooks f while being mounted on the ring 232. The element 231 has a pair of cutouts n on both left and right side portions 231*b*, 231*b*, and the pair of cutouts n partially extend a space of the receiving portion 231*r* in the lateral direction L. The cutout n is to provide flexibility to the hook f to give a force to press the ring 232 and to form the space for the ring 232 to escape when the element 231 is mounted.

Figure 4A:
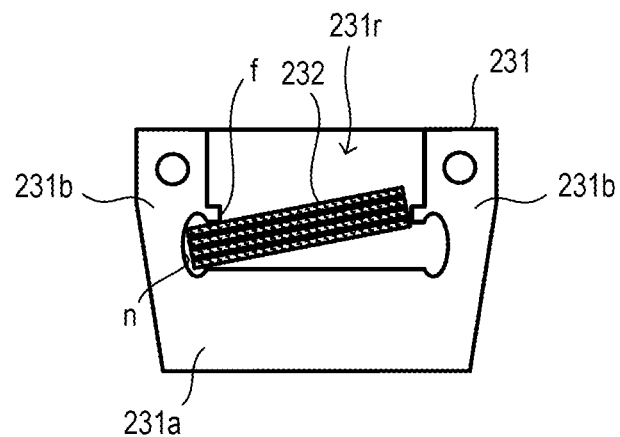
FIG. 4A is an explanatory drawing illustrating a method for assembling the belt (a mounting procedure of elements).
Figure 4B:
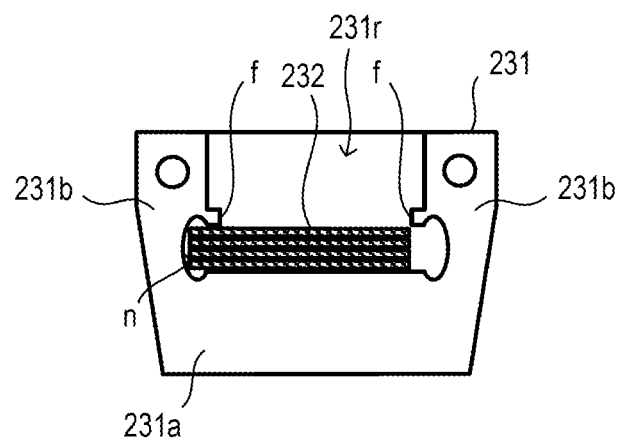
FIG. 4B is an explanatory drawing illustrating the method for assembling the belt (the mounting procedure of elements).
Figure 4C:
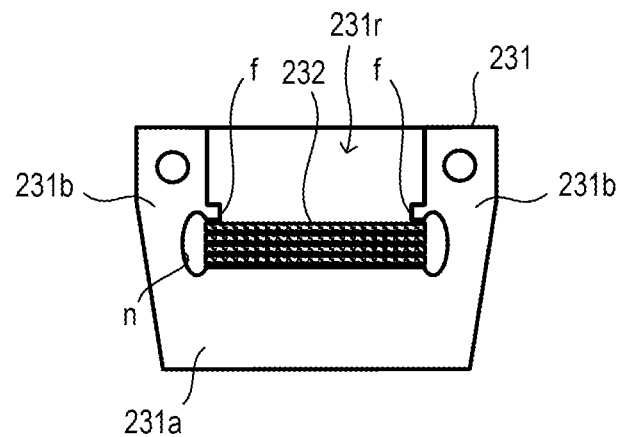
FIG. 4C is an explanatory drawing illustrating the method for assembling the belt (the mounting procedure of elements).

FIGS. 4A to 4C illustrate a method for assembling the metal belt 23, specifically, a mounting procedure of the element 231 on the ring 232 in time series. While FIGS. 4A to 4C illustrate the procedure by changing the posture of the ring 232 for ease of illustration and understanding, it is needless to say that, in the actual mounting, the orientation of the element 231 is changed.

First, with being inclined with respect to the ring 232, the element 231 is arranged on an inner peripheral side of the ring 232, and one side edge of the ring 232 is inserted into the receiving portion 231*r* of the element 231. Then, the element 231 is moved so as to bring the base portion 231*a* close to the ring 232, and as illustrated in FIG. 4A, the side edge of the ring 232 is brought to reach the cutout n through a space between the base portion 231*a* and the hook (in the state illustrated in FIG. 4A, the hook disposed on the side portion 231*b* on the left side) f disposed on the side portion 231*b* on one side.

Next, as illustrated in FIG. 4B, the element 231 is rotated about a portion of the ring 232 positioned between the base portion 231*a* and the hook f (in the state illustrated in FIG. 4B, rotated in an opposite direction of clockwise) to eliminate the inclination of the element 231 with respect to the ring 232. In this state, the element 231 has the base portion 231*a* parallel to the ring 232.

After the base portion 231*a* of the element 231 is rendered to be parallel to the ring 232, as illustrated in FIG. 4C, the element 231 is relatively moved in a direction in which the side edge of the ring 232 is taken out of the cutout n with respect to the ring 232 (in the state illustrated in FIG. 4C, the element 231 is moved to the left side) to arrange the ring 232 at the center of the base portion 231*a*. This completes mounting one element 231.

Repeating such a procedure for all the elements 231 across the whole circumference of the metal belt 23 completes the metal belt 23. The tensile force of the ring 232, and furthermore, an engagement of a projecting portion p (FIG. 3) provided on a front surface of the element 231 with a depressed portion provided on a rear surface of the adjacent element 231 cause the anterior-posterior elements 231 to be bundled with one another.

Here, in the CVT 2 using the elements 231 as the power transmission media, there may be a case where the end play as the gap between the adjacent elements 231 widens to increase the total quantity of the end plays over the whole circumference of the metal belt 23. Specifically, it is a case where an extension caused by an elastic or plastic deformation is generated in the ring 232 bundling the elements 231 and a case where the element 231 is pressed by another element 231 to be collapsed or the elements 231 are rubbed with one another to be abraded.

When the end plays locally concentrate in such a state, and furthermore, the force in the lateral direction of the metal belt 23 is applied to the element 231, the element 231 moves in the lateral direction with respect to the ring 232. Accordingly, it is concerned that the element 231 falls off of the ring 232 in a reversed movement of the procedure described prior with reference to FIGS. 4A to 4C.

Figure 5:
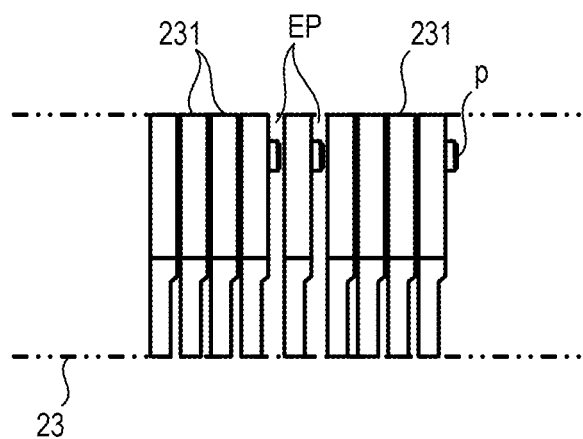
FIG. 5 is an explanatory drawing schematically illustrating a state where end plays concentrate.

FIG. 2 illustrates an end play concentrated state (end plays EP), and FIG. 5 schematically illustrates a portion of the metal belt 23 at which the concentration of the end plays is generated in an enlarged view for ease of understanding.

In this embodiment, the element 231, specifically, a direction in which the receiving portion 231r of the element 231 opens is outward with respect to the radial direction R of the metal belt 23, and therefore, in a part of the metal belt 23 where the receiving portion 231r of the element 231 points downward with respect to a vertical direction, in other words, a part in a lower side with respect to a straight line X connecting a rotational center axis Cp of the primary pulley 21 and a rotational center axis Cs of the secondary pulley 22, the fall-off of the element 231 is suppressed even if the end play EP is generated. In contrast to this, in a part where the receiving portion 231r points upward, there is a possibility of the fall-off.

Furthermore, in an upper side portion of the metal belt 23, the end play EP tends to be generated in ranges A and B illustrated in FIG. 2 due to the force applied from the pulleys 21, 22 to the metal belt 23. Here, the ranges A, B are divided into a case where the elements 231 advance in a direction to be sandwiched between the pulleys 21, 22, in other words, a case where the metal belt 23 advances in a direction to enter into a space between the pulleys 21, 22 and a case where the metal belt 23 advances in a direction to get out of the space between the pulleys 21, 22, corresponding to a direction in which the pulleys 21, 22 rotate. When the metal belt 23 advances in the entering direction (in the example illustrated in FIG. 2, the range B), the element 231 is to be sandwiched between the pulleys 21, 22 even though the end play EP is generated, and therefore, the fall-off is suppressed. On the other hand, when the metal belt 23 advances in the getting-out direction (the range A), a support by the pulleys 21, 22 is not provided, and therefore, the element 231 possibly falls off when the end play EP is generated, and a countermeasure is necessary.

(Configuration of End Play Sensor)

In this embodiment, the end play sensor 217 is made of an optical sensor, and as illustrated in FIG. 2, is installed in the CVT 2 in a state of being mounted on the sensor supporting body 24, and magnitudes of end play EP in the ranges A and B in the metal belt 23 are measured. As an optical sensor applicable to the end play sensor 217, the laser sensor can be exemplified.

The sensor supporting body 24 has a plate-shaped portion 241 forming a rectangular shape or an elongated shape in plan view schematically illustrated in FIG. 1 and a journal portion 242 extending in a thickness direction of the plate-shaped portion 241 with respect to the plate-shaped portion 241, and forms a T shape as a whole in side view illustrated in FIG. 2.

The sensor supporting body 24 is disposed on the inner peripheral side with respect to the metal belt 23 in the CVT 2, and is swingably supported about a rotation axis Cr by the journal portion 242 with respect to a shell of the CVT 2.

Here, the plate-shaped portion 241 is in the state of being interposed between the primary pulley 21 and the secondary pulley 22 in a state where the sensor supporting body 24 is supported by the shell and being sandwiched between the fixed sheaves 21a, 22a and the movable sheaves 21b, 22b of these pulleys 21, 22 and is in the state of being adjacent to the inner peripheral surface of the metal belt 23.

Furthermore, the plate-shaped portion 241 has its length set so as to extend from the range A to the range B, specifically, extend over a straight line range RNG connecting a position in the most upstream side relating to the rotation direction of the primary pulley 21 in the region where the metal belt 23 contacts the sheave surface of the primary pulley 21 to a position in the most downstream side relating to the rotation direction of the secondary pulley 22 in the region where the metal belt 23 contacts the sheave surface of the secondary pulley 22 when the vehicle is moving forward.

The journal portion 242 has its dimension or length set such that the rotation axis Cr is positioned on a straight line X connecting the rotational center axis Cp of the primary pulley 21 and the rotational center axis Cs of the secondary pulley 22 (in other words, perpendicular to the rotational center axes Cp, Cs). Since the sensor supporting body 24 has the rotation axis Cr perpendicular with respect to this straight line X and is swingable about the rotation axis Cr, the inclination of the plate-shaped portion 241 with respect to the straight line X connecting the rotational center axes Cp, Cs is variable in the cross-section illustrated in FIG. 2.

In this embodiment, as illustrated in FIG. 1, the electric motor 8 is provided to adjust the inclination of its posture or the plate-shaped portion 241 with respect to the sensor supporting body 24, and the transmission controller 201 controls the operation of the electric motor 8 and the posture of the sensor supporting body 24 corresponding to the speed ratio of the CVT 2.

The end play sensors 217 (217a, 217b) are respectively installed on both ends in a longitudinal direction of the plate-shaped portion 241. The end play sensor 217 is not limited to the optical sensor but may be made of an eddy current sensor.

(Description with Flowchart)

In this embodiment, when the end play EP (FIG. 5) larger than a predetermined length is generated in the metal belt 23 or when the CVT 2 is in the operation condition in which individual end plays between the adjacent elements 231 concentrate, a predetermined control (hereinafter referred to as a "falling-off suppressing control") that suppresses the element 231 from falling off of the ring 232 is executed. The falling-off suppressing control is embodied as a control to avoid the operation of the vehicle or the CVT 2 under a condition where the end play widens to increase the total quantity of the end play over the whole circumference of the metal belt 23 and concentrate the end plays. Other than that, the falling-off suppressing control can also be embodied as a control that suppresses a relative position shift with respect to the ring 232 of the element 231 with further direct method. In this embodiment, in particular, as a control that suppresses the widening of the end play and reduces the total quantity of the end plays over the whole circumference of the metal belt 23, the torque of the engine 1 is reduced to less than that in the operation by a usual control to reduce the torque input to the primary pulley 21. The falling-off suppressing control is a control corresponding to the "falling-off countermeasure control."

Figure 6:
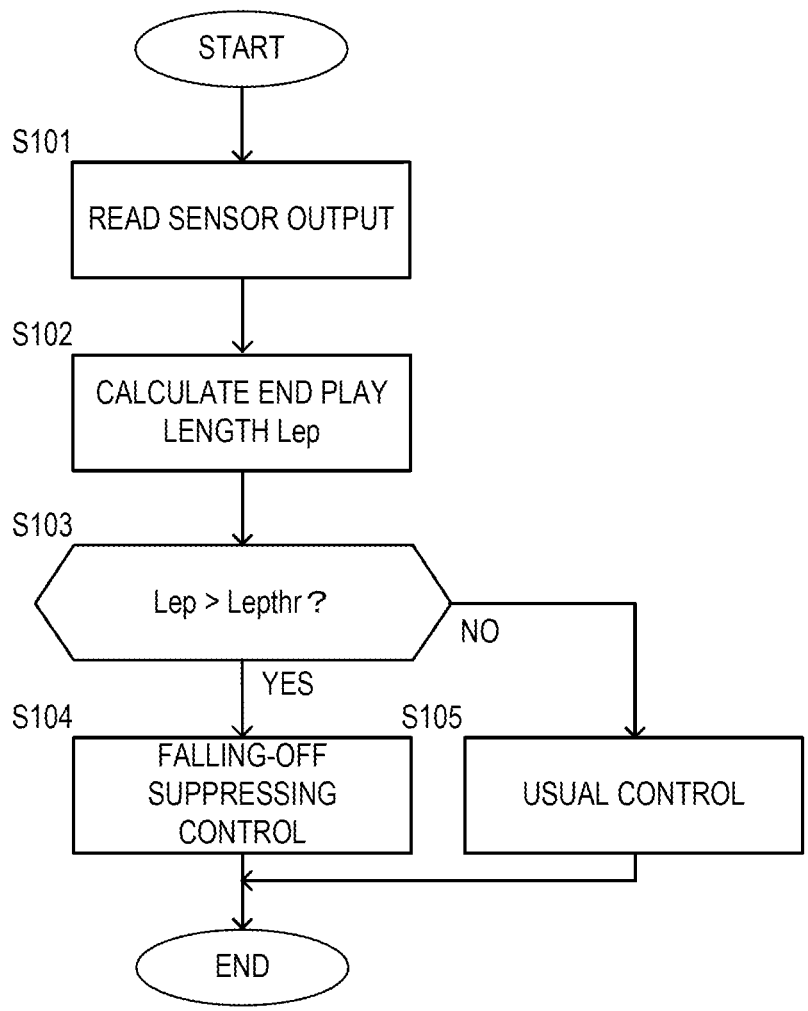
FIG. 6 is a flowchart illustrating a basic procedure of a falling-off suppressing control according to one embodiment of the present invention.

FIG. 6 illustrates a basic procedure of the falling-off suppressing control according to the embodiment in a flowchart.

In this embodiment, the falling-off suppressing control is executed by the transmission controller 201, and the transmission controller 201 is programmed to execute a control routine illustrated in FIG. 6 at a predetermined period. Not limited by the transmission controller 201, the falling-off suppressing control may be executed by the engine controller 101 or may be executed by another controller other than them.

At S101, an output of the end play sensor 217 is read.

At S102, on the basis of the output of the end play sensor 217, an end play length Lep as a magnitude of the end play EP, in this embodiment, the end play length Lep in the range B illustrated in FIG. 2 is calculated. The end play length Lep can be calculated from an output waveform of the laser sensor configuring the end play sensor 217. For example, the laser sensor as the end play sensor 217 includes a light emitting portion and a light receiving portion, and the transmission controller 201 calculates the end play length Lep on the basis of a waveform output from the laser sensor when the end play EP passes through a sensor installation portion of the sensor supporting body 24.

At S103, it is determined whether the end play length Lep is larger than a predetermined length Lepthr or not. When the end play length Lep is larger than the predetermined length Lepthr, the procedure proceeds to S104, and when the end play length Lep is equal to or less than the predetermined length Lepthr, the procedure proceeds to S105.

At S104, the falling-off suppressing control is executed as the end plays concentrate on the metal belt 23 and the end play EP larger than the predetermined length Lepthr is actually generated. In this embodiment, in order to avoid the operation of the CVT 2 under a condition where the end play widens to have a tendency of increasing the total quantity of the end plays over the whole circumference of the metal belt 23, the operating state of the CVT 2 is changed. Specifically, reducing the torque of the engine 1 to less than that in the operation by the usual control reduces the torque input to the primary pulley 21.

At S105, the falling-off suppressing control is not performed, and the usual control is maintained.

In this embodiment, the transmission controller 201 configures a "controller."

(Description of Operational Advantage)

The CVT 2 according to the embodiment and the drive system P1 including the CVT 2 are configured as described above, and the following describes the effect obtained by this embodiment.

First, when it is detected that the end play larger than the predetermined length is generated on the metal belt 23, executing the falling-off suppressing control ensures suppressing the element 231 from falling off of the ring 232.

Here, as the falling-off suppressing control, the torque of the engine 1 is reduced to less than that in the operation by the usual control, and thus, the widening of the end play is suppressed with a comparatively simple method, thereby ensuring suppressing the fall-off of the element 231. This is because, the suppressed widening of the end play reduces the total quantity of the end plays over the whole circumference of the metal belt 23, and therefore, even if the end plays (that is, individual end plays between the adjacent elements) locally concentrate, it is avoided that the end play EP formed by this increases enough to cause the fall-off of the element 231.

Second, as the falling-off suppressing control, reducing the torque of the engine 1 reduces the torque input to the primary pulley 21, and thus ensuring a reduced collapse by compression of the element 231 to ensure effectively reducing the widening of the end play.

Third, the end play sensor 217 is installed in the CVT 2, the generation of the end play EP larger than the predetermined length Lepthr is detected on the basis of the magnitude of the end play EP (the end play length Lep) measured by the end play sensor 217, and the falling-off suppressing control is executed, thereby ensuring reliably detecting the end play EP that would cause the fall-off of the element 231.

The employment of the laser sensor or the eddy current sensor as the end play sensor 217 provides a specific option for achieving the end play sensor 217 with a comparatively simple configuration.

In the above description, the end play sensor 217 measures the magnitude of the end play EP (the end play length Lep) generated on the metal belt 23, and when this end play length Lep is larger than the predetermined length Lepthr, the falling-off suppressing control is executed. That is, on the basis of the output of the end play sensor 217, whether the end play EP larger than the predetermined length Lepthr is generated or not is determined, and when such an end play EP is actually generated, the falling-off suppressing control is executed. However, the determination of whether the falling-off suppressing control is executed or not is not limited to this, but if the end play widens, it is also possible by determining whether it is under the condition where the end play larger than the predetermined length Lepthr is formed or not when the end plays concentrate. When it is under such a condition, whether or not the end play larger than the predetermined length Lepthr is actually generated, the falling-off suppressing control is preventively executed.

Figure 7:
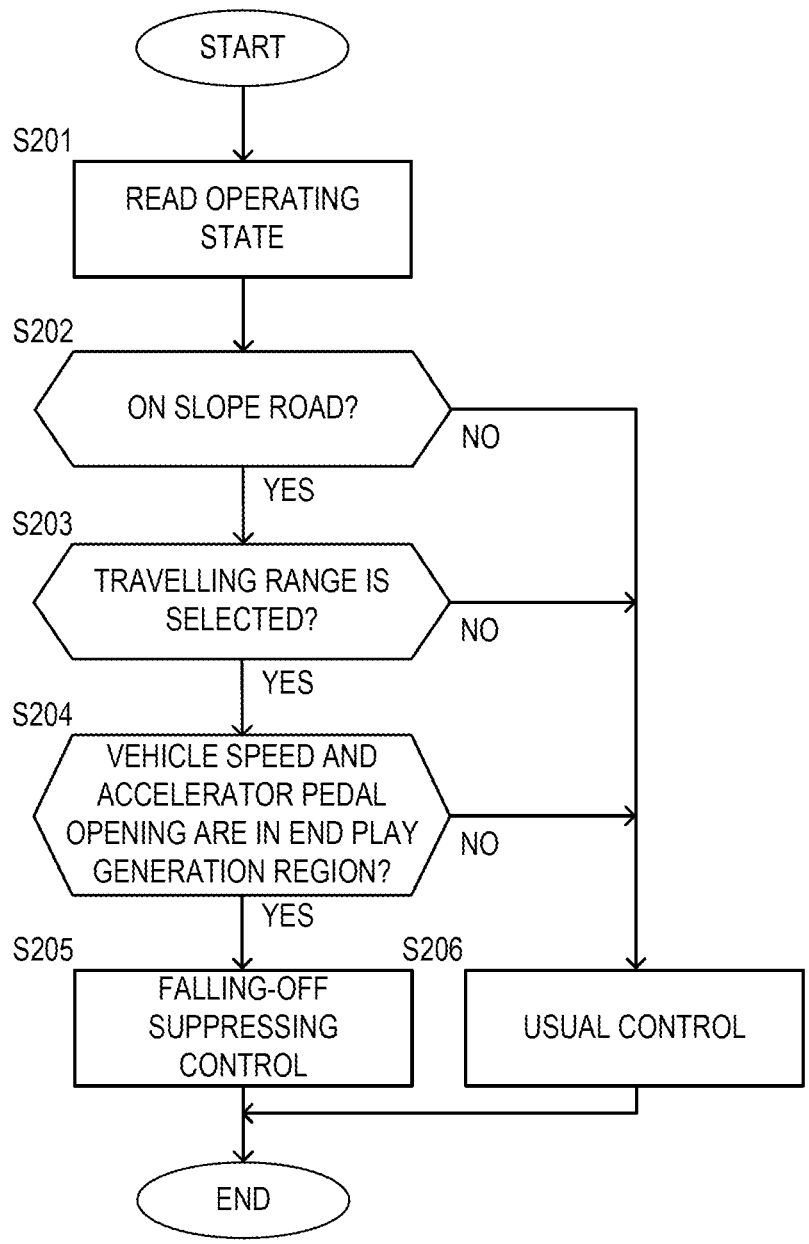
FIG. 7 is a flowchart illustrating a procedure of a modification of the falling-off suppressing control according to the embodiment.

FIG. 7 illustrates a procedure of a modification of the falling-off suppressing control according to the embodiment in a flowchart as an example of this case.

At S201, the operating state of the vehicle is read. Specifically, as the operating state relating to the falling-off suppressing control, in addition to an accelerator pedal opening APO input from the engine controller 101, a vehicle speed, a shift position and a front-rear acceleration detected by the vehicle speed sensor 211, the shift position sensor 215, and the acceleration sensor 216 are read.

At S202, it is determined whether the vehicle is on a slope road or not. The determination of whether the vehicle is on the slope road or not can be executed on the basis of the front-rear acceleration rate. When the vehicle is on the slope road, the procedure proceeds to S203, and when the vehicle is not on the slope road, the procedure proceeds to S207.

At S203, as a shift range of the CVT 2, it is determined whether a travelling range (a travelable range, such as drive or reverse, and not a range of a stop range, such as parking or neutral) is selected or not. That is, through the processes at S202 and 203, whether the vehicle is travelling on the slope road or not is determined. When the travelling range is selected, the procedure proceeds to S204, and when a shift range other than the travelling range (such as a neutral range) is selected, the procedure proceeds to S207.

At S204, when the accelerator pedal opening and the vehicle speed are measured (that is, when neither of the accelerator pedal opening and the vehicle speed is 0), it is determined whether the vehicle operation condition (specifically, the accelerator pedal opening and the vehicle speed) is in an end play generation region set in advance where the end play EP that possibly causes the fall-off of the element 231 is generated. The end play generation region can be determined by solving an equation of motion relating to a balance of force applied to the metal belt 23, and calculating whether a force enough to generate the above-described end play EP is applied to the target elements 231 (specifically, the elements in the range A illustrated in FIG. 2) in a direction to separate the adjacent elements 231 or not. Thus, since the end play generation region varies by the specification of the power transmission system, such as an elastic modulus of the metal belt 23, other than the radii of the pulleys 21, 22, it is preferred to be appropriately set corresponding to these parameters. When the vehicle operation condition is in the end play generation region, the procedure proceeds to S205, and when it is not in the end play generation region, the procedure proceeds to S206.

At S205, as the falling-off suppressing control, the torque of the engine 1 is reduced to less than that in the operation by the usual control. In this embodiment, regardless of the accelerator pedal opening APO, the throttle is kept closed, and a braking force corresponding to the accelerator pedal opening APO is generated by a braking device.

At S206, the falling-off suppressing control is not executed, but the usual control is maintained.

Thus, according to this embodiment, when it is detected that it is under the operation condition in which the end plays EP concentrate during the travelling on the slope road on the basis of the accelerator pedal opening and the vehicle speed, executing the falling-off suppressing control ensures suppressing the element 231 from falling off of the ring 232. Executing the falling-off suppressing control, for example, reducing the torque of the engine 1 to reduce the torque input to the primary pulley 21 ensure suppressing the widening of the end play to suppress the fall-off of the element 231 without needing a dedicated sensor, such as the end play sensor 217.

In the above description, as the falling-off suppressing control, the torque of the engine 1 is reduced to reduce the torque input to the primary pulley 21, thereby suppressing the widening of the end play caused by the collapse of the element 231 to suppress the fall-off of the element 231. However, the widening of the end play can be suppressed, not limited by this, but by increasing the torque of another driving source different from the engine 1, and thus indirectly reducing the torque of the engine 1, or by increasing the pressure of the hydraulic oil of the CVT 2 that generates the pulley thrust.

DESCRIPTION OF OTHER EMBODIMENTS

Figure 8:
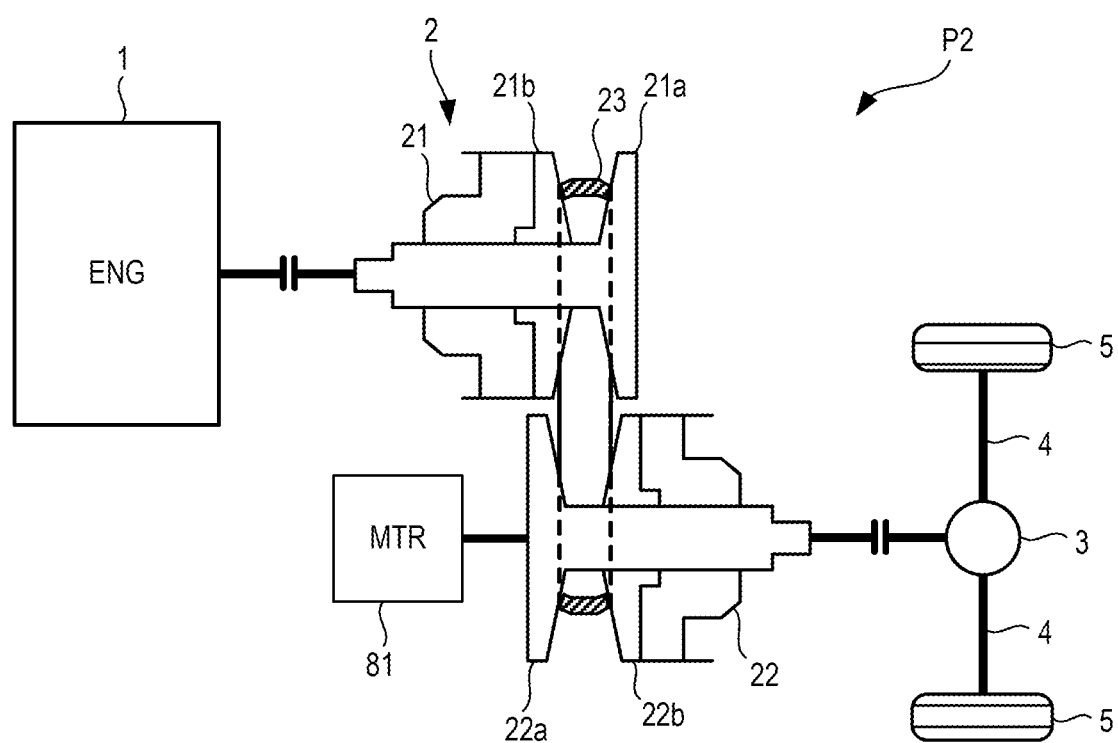
FIG. 8 is a schematic diagram illustrating a configuration of a power transmission system of a vehicle according to another embodiment of the present invention.

FIG. 8 schematically illustrates an overall configuration of the driving system P2 of a vehicle according to another embodiment of the present invention.

In this embodiment, as a driving source of the vehicle, an electric motor 81 as a second driving source is included in addition to the engine 1 as the first driving source. The electric motor 81 is a motor-generator configured to operate as an electric generator and as a motor, and is provided to transmit a power to the driving wheels 5, 5 without via the CVT 2. Here, "without via the CVT 2" means without speed change by the CVT 2, and includes, not limited to the case where the electric motor 81 is arranged between the CVT 2 and the driving wheels 5, 5 on a power transmission path coupling the engine 1 to the driving wheels 5, 5, but also the case where the electric motor 81 is connected to the output shaft of the secondary pulley 22 so as to substantially be on a power transmission path in a downstream side with respect to the CVT 2. FIG. 8 illustrates the latter example.

The falling-off suppressing control according to the embodiment is embodied as the control that increases the torque of the electric motor 81 when the end play larger than the predetermined length Lepthr is generated on the metal belt 23 or the CVT 2 is under the operation condition in which the end plays concentrate.

Thus, increasing the torque of the electric motor 81 ensures reducing the torque that is assigned to the engine 1 in the torque necessary to achieve a requested acceleration rate of the vehicle, in other words, the torque input to the primary pulley 21 to suppress the widening of the end play.

Figure 9:
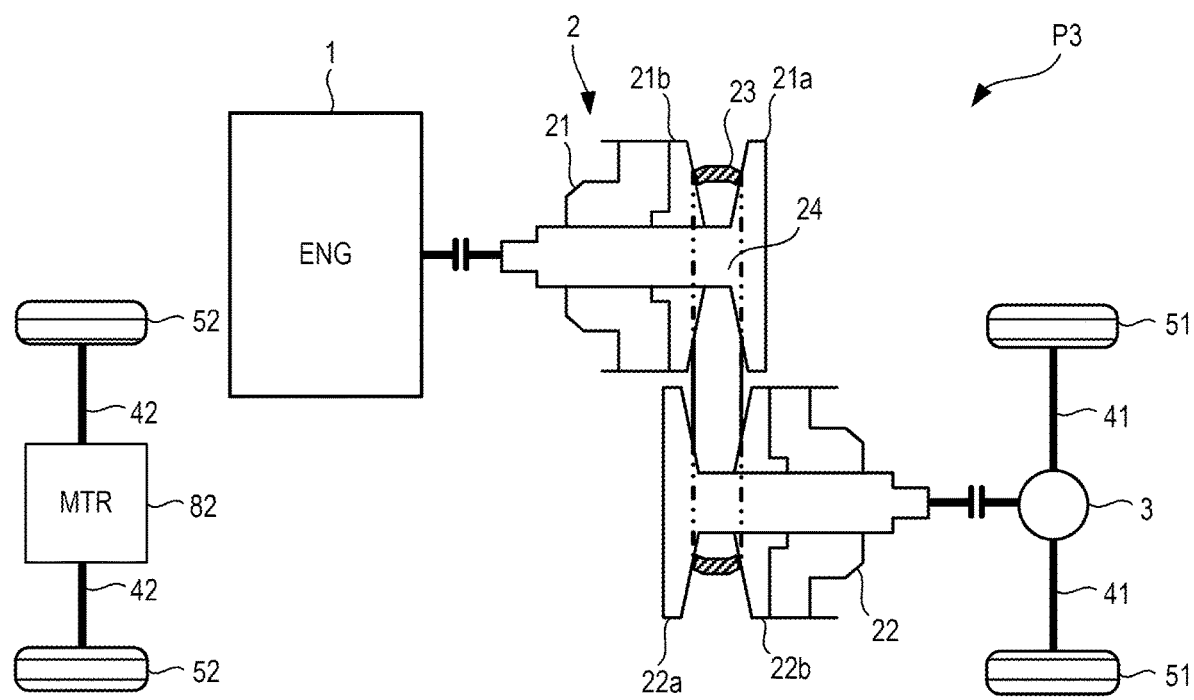
FIG. 9 is a schematic diagram illustrating a configuration of a power transmission system of a vehicle according to yet another embodiment of the present invention.

FIG. 9 schematically illustrates an overall configuration of a driving system P3 of a vehicle according to yet another embodiment of the present invention.

The driving system P3 according to the embodiment is different from the driving system P2 according to the prior embodiment in that an electric motor 82 as a second driving source is provided to transmit a power, not to first driving wheels 51, 51 that receive the transmission of the power from the engine 1, but to second driving wheels 52, 52 different from the first driving wheels 51, 51. Here, the electric motor 82 can transmit the power to the driving wheels (that is, the first driving wheels) 51, 51, without via the CVT 2, similarly to the electric motor 81 of the driving system P2.

The falling-off suppressing control according to the embodiment is also similar to the prior embodiment. Specifically, the torque of the electric motor 82 is increased to reduce a proportion or a distribution that the engine torque occupies with respect to the requested driving torque, and through the reduced torque input to the primary pulley 21, it is possible to suppress the widening of the end play.

The falling-off suppressing control may be increasing a pressure of the hydraulic oil of the CVT 2 that generates a pulley thrust to more than that in the operation by the usual control, not limited to reducing the torque of the engine 1, in other words, reducing the input torque to the primary pulley 21.

This increases the tensile force of the ring 232 and reduces the torque assigned to the element 231 in the torque transmitted by the belt 23 to suppress the collapse of the element 231, thereby ensuring suppressing the widening of the end play. While the increased tensile force accelerates the extension of the ring 232, suppressing the collapse of the element 231 where an influence on the widening of the end play further significantly appears ensures suppressing the widening of the end play not by way of the reduction of the engine torque.

Furthermore, the falling-off suppressing control can be embodied, not only by the change of the operating state of the CVT 2, but also by spraying a lubricating oil of the CVT 2 to the part where the concentration of the end plays is generated (for example, the part in the range B indicated by the dotted line in FIG. 2) in the metal belt 23.

Figure 10:
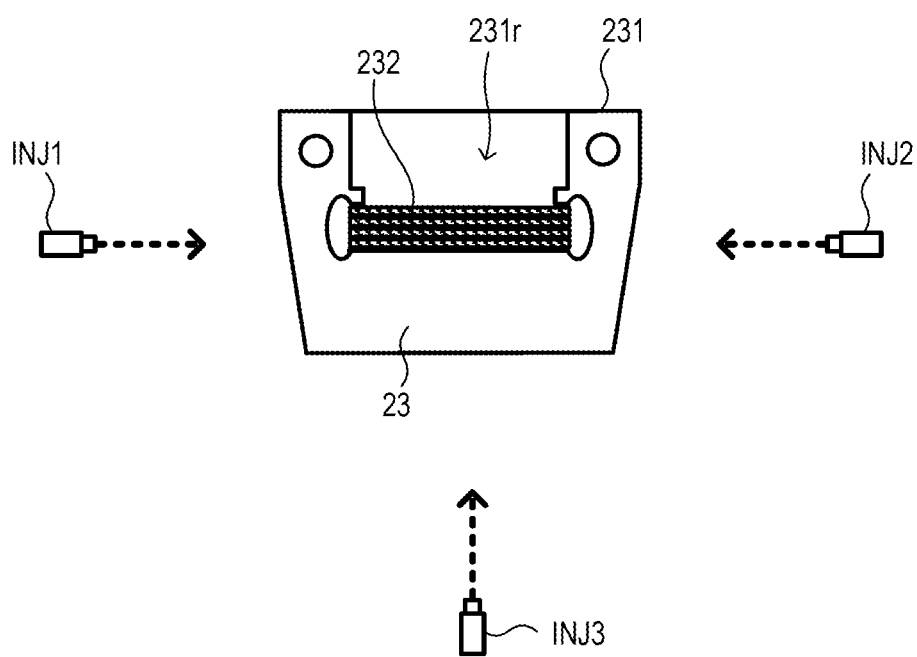
FIG. 10 is an explanatory drawing illustrating a falling-off suppressing method of the element by spraying a lubricating oil.

FIG. 10 schematically illustrates the falling-off suppressing control when the lubricating oil is sprayed.

A plurality of oil injectors INJ1 to INJ3 are arranged so as to ensure injecting the lubricating oil of the CVT 2 to the metal belt 23. In this embodiment, three oil injectors INJ1 to INJ3 are disposed. The oil injectors INJ1, INJ2 are disposed at positions from which the lubricating oil is sprayed to the element 231 in the opposite direction of the direction in which the position shift is generated. The oil injector INJ3 is disposed at a position from which the lubricating oil is sprayed in the opposite direction of the direction in which the receiving portion 231r opens. The pressure of the lubricating oil sprayed to the element 231 from a side portion by the oil injectors INJ1, INJ2 suppresses the position shift itself of the element 231, and the pressure of the lubricating oil sprayed from a lower side by the oil injector INJ3 supports the element 231, thereby ensuring suppressing the fall-off from the ring 232.

Here, when the lubricating oil is already supplied by any one of the oil injectors INJ1 to INJ3, the falling-off suppressing control may be increasing the supply amount by the oil injector.

In addition to the above, the direction in which the receiving portion 231r opens in the state where the element 231 is mounted on the ring 232 may be to an outer peripheral side (that is, outside in a radial direction) of the metal belt 23 or may be to an inner peripheral side (inside in the radial direction). When the receiving portion 231r opens to the inside in the radial direction of the metal belt 23, the direction in which the lubricating oil is sprayed by the oil injector INJ3 is opposite of the direction illustrated in FIG. 10 when the fall-off of the element 231 is suppressed by spraying the lubricating oil.

In the above description, the first driving source and the second driving source which can transmit the power to the driving wheels 5, 5 without via the CVT 2 are provided, and the engine 1 is employed as the first driving source and the electric motors 81, 82 are employed as the second driving source. However, the first driving source can be configured of, not only the internal combustion engine, but an electric motor (for example, a motor-generator) or a combination of the internal combustion engine and the electric motor.

While the embodiments of the present invention have been described above, the present invention is not limited to these, and it is needless to say that various changes and modifications are made within a range of the matter disclosed in claims.

The present application claims a priority of Japanese Patent Application No. 2019-70608 filed with the Japan Patent Office on Apr. 2, 2019, all the contents of which are hereby incorporated by reference.

The invention claimed is:

1. A continuously variable transmission mounted on a vehicle, comprising:
   a primary pulley;
   a secondary pulley;
   a belt wound around the primary pulley and the secondary pulley, the belt including:
      a ring; and
      a plurality of elements bundled by the ring, the elements having respective receiving portions opening in a radial direction of the belt, the elements receiving the ring in the receiving portions; and
   a controller configured to
      based on an operation condition of the vehicle, detect that the continuously variable transmission is under an operation condition in which a gap larger than a threshold is generated on the belt; and
      execute a preliminarily determined falling-off countermeasure control of the elements when the continuously variable transmission is detected to be under the operation condition in which the gap larger than the threshold is generated on the belt.

2. The continuously variable transmission according to claim 1, wherein
   the controller is further configured to detect that the continuously variable transmission is under the operation condition in which the gap larger than the threshold is generated on the belt based on an accelerator pedal opening and a vehicle speed.

3. The continuously variable transmission according to claim 2, wherein
   the controller is further configured to detect that the continuously variable transmission is under the operation condition in which the gap larger than the threshold is generated on the belt when the vehicle is on a sloped road.

4. The continuously variable transmission according to claim 1, wherein
   the controller is further configured to reduce a torque input to the primary pulley as the falling-off countermeasure control.

5. The continuously variable transmission according to claim 1, wherein
   as driving sources of the vehicle on which the continuously variable transmission is mounted, the vehicle including:
      a first driving source; and
      a second driving source arranged to be adapted to transmit a power to driving wheels without via the continuously variable transmission, and
   the controller is further configured to increase a torque of the second driving source as the falling-off countermeasure control.

6. The continuously variable transmission according to claim 1, wherein
   the controller is further configured to increase a pressure of a hydraulic oil that generates a pulley thrust as the falling-off countermeasure control.

7. The continuously variable transmission according to claim 1, wherein
   the controller is further configured to spray a lubricating oil of the continuously variable transmission to a part preliminarily determined as a part where the gap larger than the threshold is generated on the belt as the falling-off countermeasure control.

8. A control method for controlling a continuously variable transmission mounted in a vehicle, the continuously variable transmission including a plurality of elements receiving a ring in receiving portions opening in a radial direction of a belt and being bundled by the ring, the control method comprising:
   based on an operation condition of the vehicle, detecting that the continuously variable transmission is under an operation condition in which a gap larger than a threshold is generated on the belt; and
   executing a preliminarily determined falling-off countermeasure control of the elements when the continuously variable transmission is detected to be under the operation condition in which the gap larger than the threshold is generated between the plurality of elements.

9. A continuously variable transmission mounted on a vehicle, comprising:
   a primary pulley;
   a secondary pulley;
   a belt wound around the primary pulley and the secondary pulley, the belt including:
      a ring; and
      a plurality of elements bundled by the ring, the elements having respective receiving portions opening in a radial direction of the belt, the elements receiving the ring in the receiving portions;
   means for, based on an operation condition of the vehicle, detecting that the continuously variable transmission is under an operation condition in which a gap larger than a threshold is generated on the belt; and
   means for executing a preliminarily determined falling-off countermeasure control of the elements when the continuously variable transmission is detected to be under the operation condition in which the gap larger than the threshold is generated on the belt.

* * * * *